United States Patent
Deolalikar et al.

(10) Patent No.: US 7,190,980 B2
(45) Date of Patent: Mar. 13, 2007

(54) METHOD AND SYSTEM FOR POWER CONTROL IN WIRELESS PORTABLE DEVICES USING WIRELESS CHANNEL CHARACTERISTICS

(75) Inventors: Vinay Kumar Deolalikar, Mountain View, CA (US); Tajana Simunic Rosing, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 247 days.

(21) Appl. No.: 10/769,044

(22) Filed: Jan. 30, 2004

(65) Prior Publication Data

US 2005/0170801 A1    Aug. 4, 2005

(51) Int. Cl.
H04B 1/38    (2006.01)

(52) U.S. Cl. .......... 455/574; 455/226.1; 455/226.2; 455/226.3; 455/513; 455/343.2

(58) Field of Classification Search ........... 455/513, 455/574, 67.11, 343.2, 226.1, 226.2, 226.3, 455/506; 370/335, 342
See application file for complete search history.

(56) References Cited

U.S. PATENT DOCUMENTS

| | | | |
|---|---|---|---|
| 6,236,674 B1* | 5/2001 | Morelli et al. | 375/219 |
| 6,469,992 B1* | 10/2002 | Schieder | 370/329 |
| 6,853,840 B2* | 2/2005 | Najafi | 455/410 |
| 6,907,061 B1* | 6/2005 | Jechoux | 375/144 |
| 2002/0150064 A1* | 10/2002 | Lucidarme | 370/333 |
| 2003/0193914 A1* | 10/2003 | Lomp et al. | 370/335 |
| 2004/0190475 A1* | 9/2004 | Hamalainen et al. | 370/335 |
| 2004/0214616 A1* | 10/2004 | Malcolm | 455/574 |

\* cited by examiner

Primary Examiner—Duc M. Nguyen
Assistant Examiner—Wayne Cai

(57) ABSTRACT

A method controls the operation of devices which communicate over a wireless communications channel. The method includes determining a parameter of a received signal communicated over the wireless communications channel and determining a minimum threshold value of the received signal. An average duration of fade is determined using the parameter and the minimum threshold. The method detects whether the received signal is less than the minimum threshold value. At least one of the devices is placed in a sleep mode for approximately the average duration of fade in response to the received signal being detected as less than the minimum threshold value. The determined parameter of the received signal may be the root mean square value of the received signal.

25 Claims, 3 Drawing Sheets

METHOD AND SYSTEM FOR POWER CONTROL IN WIRELESS PORTABLE DEVICES USING WIRELESS CHANNEL CHARACTERISTICS

TECHNICAL FIELD

The present invention relates generally to wireless systems, and more specifically to reducing the power consumed by portable devices in wireless systems.

BACKGROUND OF THE INVENTION

Wireless communications networks are commonplace today as a wide variety of appliances or portable wireless devices, such as audio and video media players and personal digital assistants, are being developed to provide users with content via wireless communications channels. A typical portable wireless device includes a processor for executing specific software and performing required tasks, memory for storing programs and data, a display for conveying information to a user, a keypad or other type of input device to allow a user to input data, and a wireless interface for communicating over a wireless communications channel to other devices in the network. Because a portable wireless device is typically battery powered, the power consumption of the components in the device is ideally minimized to extend the life of the batteries.

While all components in a portable wireless device consume power, the wireless interface is in many instances the component that consumes the largest portion of the overall power. As a result, lowering the power consumption of the wireless interface will significantly lower the overall power consumption of the portable wireless device. A variety of different approaches have been utilized to lower the power consumption of the wireless interface. These approaches generally involve turning off the wireless interface based upon the information being communicated over the wireless communications channel. For example, one approach is to temporarily turn off the operation of the interface whenever a receive buffer in the portable wireless device is full. The rationale of this approach is that since the portable device cannot receive and store any more incoming message packets being communicated over the wireless communications channel, the interface is temporarily placed in a sleep mode to conserve power until the device can once again receive and store more incoming packets. A performance penalty is experienced with this approach, however, due to the increased time required to communicate the required message packets to the device. This increased time is caused by the periods of time during which the interface is placed in the sleep mode and unable to receive and store any packets being communicated.

Another approach is to determine whether message packets to be communicated over the channel are directed to a particular portable device. When they are not, the wireless interface is placed in the sleep mode to save power. This approach may not, however, result in much power savings in networks where broadcast message packets are transmitted by a device in the network. A broadcast message is a message that is intended to be received and processed by all portable wireless devices proximate the transmitting device. Broadcast messages can significantly reduce the opportunities for a given portable wireless device to place its wireless interface into the sleep mode, reducing the power savings that may be realized using this approach.

There is a need for lowering the power consumption of portable wireless devices without adversely affecting the performance of the communications channel used to communicate with the device.

SUMMARY OF THE INVENTION

According to one aspect of the present invention, a method controls the operation of devices which communicate over a wireless communications channel. The method includes determining a parameter of a received signal communicated over the wireless communications channel and determining a minimum threshold value of the received signal. An average duration of fade is determined using the parameter and the minimum threshold. The method detects whether the received signal is less than the minimum threshold value. At least one of the devices is placed in a sleep mode for approximately the average duration of fade in response to the received signal being detected as less than the minimum threshold value. The determined parameter of the received signal may be the root mean square value of the received signal.

DETAILED DESCRIPTION OF PREFERRED EMBODIMENTS

Figure 1:
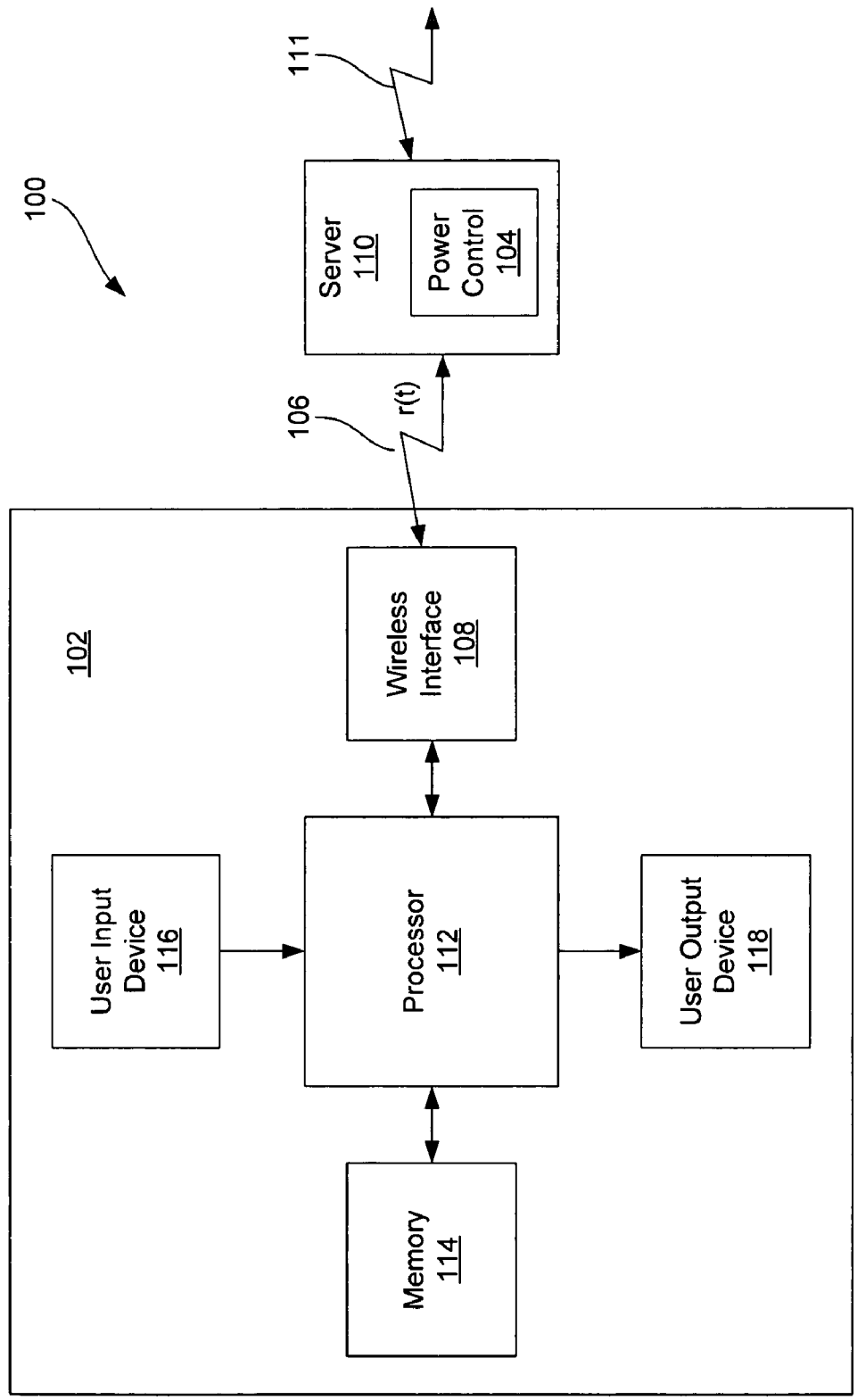
FIG. 1 is a functional block diagram of a wireless network including a portable wireless device having reduced power consumption by disabling selected components as a function of the characteristics of a wireless communications channel according to one embodiment of the present invention.

FIG. 1 is a functional block diagram of a wireless network 100 including a portable wireless device 102 having reduced power consumption due to the operation of a power control component 104 according to one embodiment of the present invention. In operation, the power control component 104 disables selected components in the portable wireless device 102 as a function of the characteristics of a received signal r(t) received on a wireless communications channel 106, as will be explained in more detail below. In this way, the power control component 104 reduces the power consumption of the portable wireless device 102 by preventing the operation of certain components in the device during times when the quality of performance of the channel 106 is below an acceptable level.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

The portable wireless device 102 includes a wireless interface 108 that communicates with a server system 110 over the wireless communications channel 106. The power control component 104 is contained in the server system 110, which typically corresponds to a stationary access point or other network device in the wireless network 100. Although the wireless network 100 has a client-server architecture with the portable wireless device 102 corresponding to a client system, the wireless network may have different architectures in other embodiments of the present invention. The server system 110 provides the portable wireless device 102 access to a network 111 such as the Internet via the communications channel 106.

The wireless interface 108 demodulates and decodes received signals from the server system 110 and provides corresponding data to a processor 112, which executes software to process the data and to perform desired calculations or tasks. The wireless interface 108 also encodes and modulates data received from the processor 112, and communicates the data over the wireless communications link 106 to the server system 110. A memory 114 stores programs executed by the processor 112 and also stores associated data. A user input device 116, such as a keypad, is coupled to the processor 112 and allows a user of the portable wireless device 102 to provide input to the device. A user output device 118, which may be a visual display and/or a speaker, is coupled to the processor 112 and provides output to a user of the device 102.

In operation, the power control component 104 monitors the received signal r(t) from the wireless interface 108 in the portable wireless device 102 and executes a power-reduction process to selectively activate and deactivate the wireless interface as a function of the received signal, thereby lowering the power consumption of the portable wireless device. More specifically, the power control component 104 monitors the received signal r(t) to detect "fading" of the received signal. The term fading refers to random fluctuations of the amplitude and phase of the received signal r(t) due to variations in the operational characteristics of the wireless communications channel 106. These variations in operational characteristics are caused by signals propagating over the wireless communications channel 106 between the portable wireless device 102 and the server system 110 traveling over multiple reflective paths, which is a phenomenon referred to as multiple path propagation. Also note that fading of signals communicated over the channel 106 occurs for signals propagating in both directions, namely from device 102 to server system 110 and from server system to device. The terms fading, fade, and "fade condition" may be used interchangeably in the present description.

When the power control component 104 detects fading of the received signal r(t), the component communicates a power-down command to the wireless interface 108 via the channel 106. In response to the power-down command, the wireless interface 108 is turned off or deactivated for an anticipated duration of the fading. This reduces the power consumption of the device 102 since the wireless interface 108 is not operating during fading while the quality of performance of the channel 106 is below an acceptable level. If the wireless interface 108 was attempting to communicate data via the wireless channel 106 during such a fade, this information may need to be communicated again because of the insufficient quality of performance of the channel. After the anticipated duration of the fade has lapsed, the power control component 104 communicates a power-up command via the channel 106 to the wireless interface 108. In response to the power-up command, the wireless interface 108 is turned on or activated and resumes normal operation of communicating signals over the wireless channel 106. In one embodiment, the anticipated duration of a fade is given by a statistically determined average duration of fade for the wireless channel 106, as will be discussed in more detail below.

Before describing in more the detail the power-reduction process executed by the power control component 104, the characteristics and model used for the wireless communications channel 106 will first be described. As will be understood by those skilled in the art, in the study of communications systems a communications channel is modeled or characterized to describe the properties of signals propagating over the channel, such as the attenuation of the power of a transmitted signal versus distance from an antenna generating that signal. For example, a communications channel may be modeled as an ideal free space channel where the region between a transmitting antenna and a receiving antenna is assumed to be free of any objects that might absorb or reflect electromagnetic signals propagating over the channel, including the atmosphere and the earth.

This assumption for an ideal free space channel is inadequate to accurately model most practical communications channels, like the wireless communications channel 106. Instead, as previously mentioned, signals propagating over the wireless communications channel 106 can travel between the portable wireless device 102 and the server system 110 over multiple reflective paths, which results in fading of the received signal r(t). Fading may be characterized as being of different types, with each type being defined by the event causing the fading. One type of fading in the wireless communications channel 106 is caused by relatively small changes in the spatial separation between the portable wireless device 102 and the server system 110, where these changes may be as small as one half the wavelength $\lambda$ of the received signal. This type of fading is known as "small-scale" or "Rayleigh" fading because the amplitude envelope of the received signal is statistically described by a Rayleigh probability density function (pdf). A communication channel is characterized by Rayleigh fading if there are a large number of multiple reflective paths and there is no line-of-sight or direct propagation path between receiving and transmitting antennas. The wireless communications channel 106 is assumed to be characterized by Rayleigh fading in the present description. In addition to fading, relative motion between the portable wireless device 102 and server system 110 results in a Doppler frequency shift of signals communicated over the channel 106, as will be understood by those skilled in the art.

Figure 2:
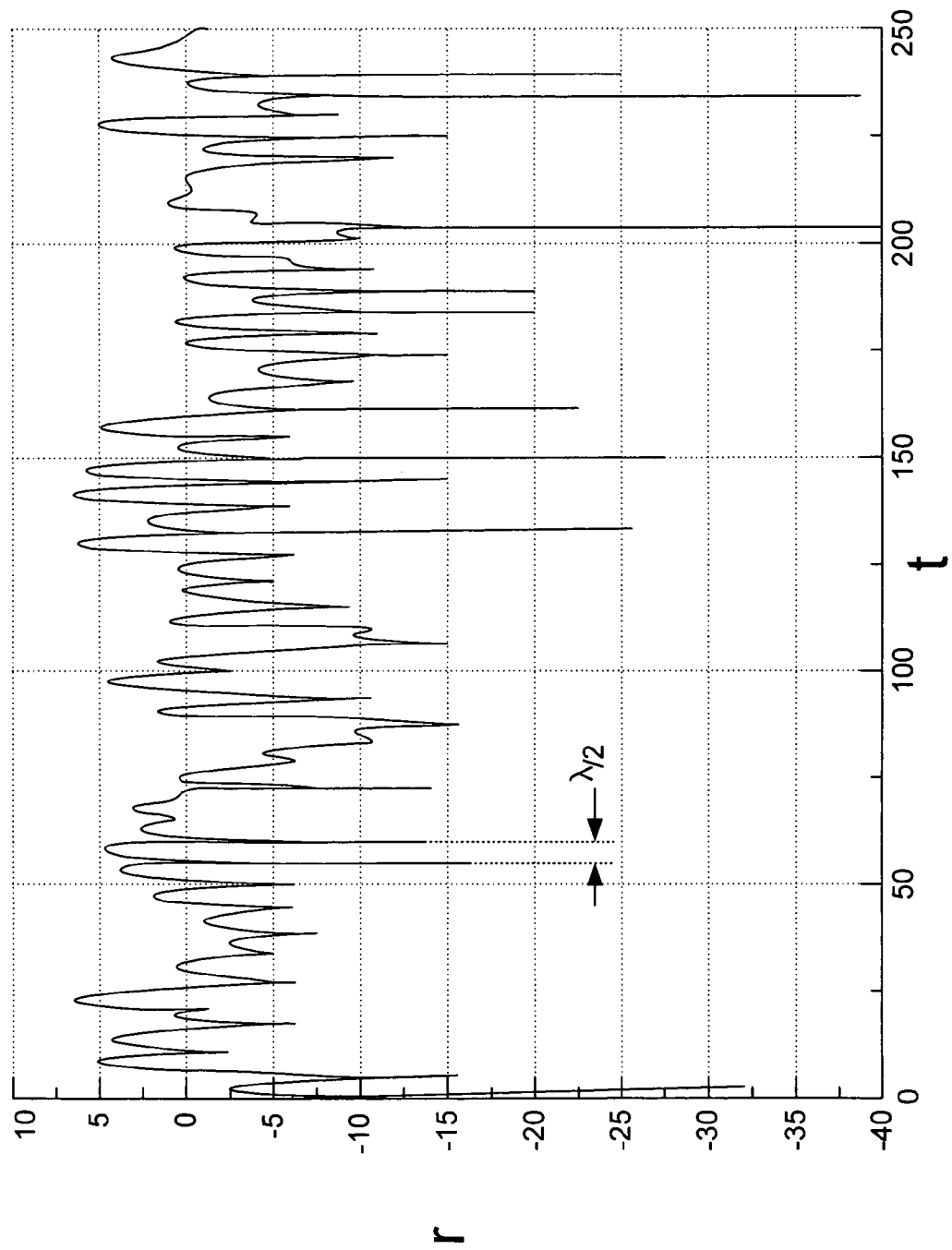
FIG. 2 is a graph showing a sample Rayleigh fading envelope of a Rayleigh fading signal received by the portable wireless device of FIG. 1.

FIG. 2 is a graph showing a sample Rayleigh fading envelope of the received signal r(t) received by the server system 110. The graph shows the effects of Rayleigh fading on the amplitude of the received signal r(t) as a function of time. The amplitude of the signal r(t) is shown on the vertical axis as a decibel (dB) value about a root-mean-square (rms) value of the signal, and time is shown on the horizontal axis.

When the received signal r(t) is described as being below a specified value or threshold in the present description, this is referring to the amplitude of the received signal being below the specified value or threshold, as will be appreciated by those skilled in the art.

The power control component 104 utilizes a number of values in executing the previously mentioned power-reduction process, and formulas for these values will now be derived before describing the overall process in more detail. The received signal r(t) has an expected level crossing rate that is defined as the expected rate a which a Rayleigh fading envelope of the signal, normalized to a local root-mean-square (rms) level, crosses a specified level R in the positive going direction. The positive going direction of the received signal r(t) means the slope the time derivative $\dot{r}$ of the signal r is positive when the signal crosses the level R. If $p(R, \dot{r})$ is the joint density function of r and $\dot{r}$ evaluated at r=R, $f_m$ is the maximum Doppler frequency of the signal r, and $\rho$ is the normalized local rms amplitude RMS of the Rayleigh fading envelope of the received signal r(t), then the number of level crossings per second $N_R$ is given by $$N_R = \int_0^\infty \dot{r} p(R, \dot{r}) d\dot{r} = \sqrt{2\pi} f_m \rho e^{-\rho^2}. \quad (1)$$

Now that the number of level crossing $N_R$ has been determined, the average duration of a fade in the wireless communications channel 106 may be determined. The average duration of fade $\bar{\tau}$ is defined as the average time period for which the received signal r(t) is below the specified level R, which indicates how long a "bad fade" can be expected to last. A bad fade is thus a fade where the received signal r(t) is below the specified level R, and indicates a condition where the required quality of performance of the channel 106 cannot be ensured. The average duration of fade $\bar{\tau}$ is given by $$\bar{\tau} = \frac{1}{N_R} Pr[r \leq R], \quad (2)$$

where $Pr[r \leq R]$ is the probability that the Rayleigh fading signal r(t) is below the specified level R. This probability is given by $$Pr[r \leq R] = \frac{1}{T} \sum_i \tau_i, \quad (3)$$

where $\tau_i$ is the duration of the fade and T is the observation interval of the fading signal r(t). Since the received signal r(t) satisfies a Rayleigh probability distribution $\rho(r)$ according to the assumed characteristics of the channel 106, the probability that the Rayleigh fading signal is below the specified level R is given by $$Pr[r \leq R] = \int_0^R p(r) d r - 1 - \exp(-\rho^2). \quad (4)$$

From equations (1), (2), and (3), the average duration of fade $\bar{\tau}$ as a function $\rho$ and $f_m$ is given by $$\bar{\tau} = \frac{\exp(\rho^2) - 1}{\rho f_m \sqrt{2\pi}}. \quad (5)$$

Figure 3:
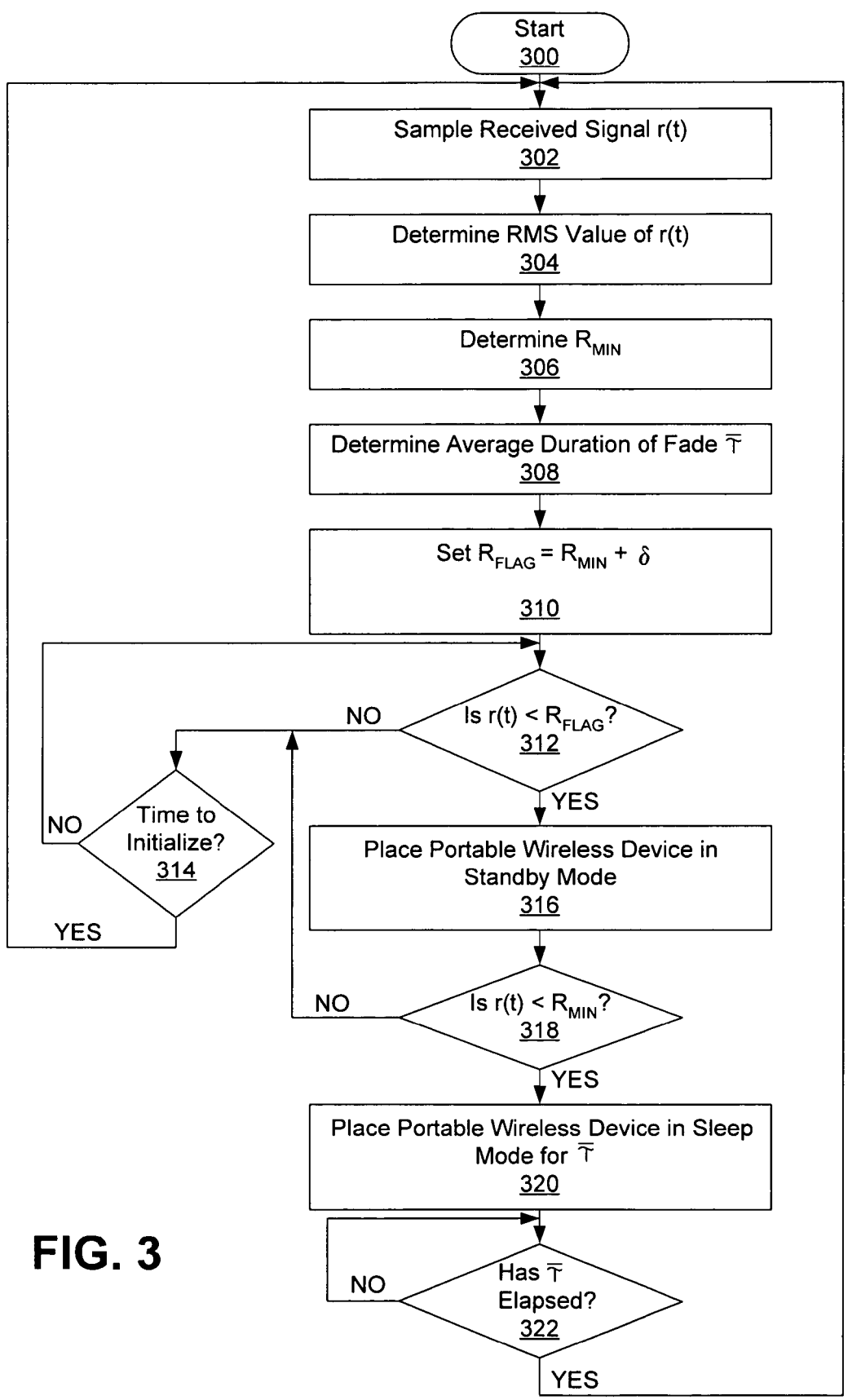
FIG. 3 is a flow chart illustrating a power-reduction process executed by a power control component in the server system of FIG. 1 according to one embodiment of the present invention.

FIG. 3 is a flow chart illustrating in more detail the power-reduction process executed by the power control component 104 of FIG. 1 for detecting a fade condition in the wireless communications channel 106 and selectively activating and deactivating the wireless interface 108 for an expected duration of the fade condition according to one embodiment of the present invention. The process starts in step 300 and proceeds immediately to step 302 where the received signal r(t) is sampled at a sufficient rate, which is dependent on the frequency of the signal r(t). Using the samples of the signal r(t), the process goes to step 304 and initializes the power control component 104 (FIG. 1) by determining an rms value of the signal r(t), which is designated RMS. The process is executed frequently enough to ensure that a new RMS value for the received signal r(t) is computed without the portable wireless device having moved too far from its location during the prior initialization. The frequency of the process must not be so high, however, that all samples of the received signal r(t) occur within a given fade, or else an accurate RMS value of the received signal will not be determined.

After the RMS value of the received signal r(t) has been determined in step 304, the process goes to step 306 and determines a minimum threshold RMIN below which the received signal r(t) cannot drop to maintain a required quality of performance of the wireless communications channel 106. As will be understood by those skilled in the art, the quality of performance of the communications channel 106 is characterized by a signal-to-noise ratio (SNR) and a corresponding bit error rate (BER), with the SNR being selected to achieve a desired BER of the channel. The desired BER determines the required SNR which, in turn, determines the value of RMIN. When the amplitude of the received signal r(t) drops below the threshold RMIN, the wireless interface 108 (FIG. 1) should be deactivated since the SNR of the received signal is lower than required to maintain the specified BER.

Once the value of RMIN has been determined, the process goes to step 308 an uses equation (5) to calculate the average duration of fade $\bar{\tau}$. In equation (5), $\rho$ is the normalized local rms amplitude RMS of the Rayleigh fading envelope of the received signal r(t) and is given by RMS/RMIN. From step 308 the process goes to step 310 and sets a flag $R_{FLAG}$ to a value equal to the threshold RMIN plus a margin value $\delta$. The margin value $\delta$ is simply a small value added to the threshold RMIN to indicate that the received signal r(t) is approaching the threshold.

After the value of the flag $R_{FLAG}$ is set in step 310, the process goes to step 312 and determines whether the received signal r(t) is less than the flag $R_{FLAG}$. When the determination is negative, the process goes to step 314 and determines if it is time to initialize the process once again. If this determination is positive, the process goes back to step 302 and the received signal r(t) is again sampled. If step 314 determines it is not time to initialize the process, the process goes back to step 312 and again determines whether the received signal r(t) is less than the flag $R_{FLAG}$.

When step 312 determines the received signal r(t) is less than the flag $R_{FLAG}$, the process goes to step 316 and the power control component 104 communicates a standby command over the channel 106 to place the portable wireless device 104 into a standby mode of operation. In the standby mode certain data is saved and other operations may be performed in anticipation of the portable wireless device 104 entering a sleep mode of operation. From step 316, the process goes to step 318 and determines whether the received signal r(t) is less than the threshold RMIN. When this determination is positive, the process goes to step 320 and the power control component 104 communicates a sleep command over the channel 106 to the portable wireless device 102. In response to the sleep command, the wireless interface 108 is deactivated to place the wireless device 102 into the sleep mode of operation. In the sleep mode, the wireless interface 108 does not communicate signals and has reduced power consumption. Other components in the portable wireless device 102 may also be deactivated responsive to the sleep command to further lower the power consumption of the device during the sleep mode. Note that in this embodiment of the power-reduction process, the standby and sleep commands collectively correspond to the power-down command described with reference to the wireless network 100 of FIG. 1.

From step 320, the process goes to step 322 and determines whether the average duration of fade $\bar{\tau}$ has elapsed. When this determination is positive, the power control component 104 communicates the power-up command over the channel 106 to the portable wireless device 102. In response to the power-up command, the wireless interface 108 resumes communicating signals to the server system 110 over the channel 106. Returning step 318, if the received signal r(t) is not less than the threshold RMIN, the process goes back to step 314.

The power-reduction process of FIG. 3 determines when the received signal r(t) is about experience a fade condition, meaning that the received signal will drop below the threshold RMIN. When a fade condition is detected, the wireless interface 108 and possibly other components in the portable wireless device 102 are deactivated to place the device into the sleep mode of operation and thereby lower the power consumption of the device. In this way, the portable wireless device 102 does not operate to communicate over the wireless communications channel 106 during periods when the quality of performance of the channel is below an acceptable level. This lowers the power consumption of the device 102 during this time and thus the overall power consumption of the device. The portable wireless device 102 operates in the sleep mode for the approximately the calculated average duration of fade $\bar{\tau}$, and once this time has lapsed the wireless interface 108 is activated and the device enters the normal operating mode and begins communicating over the wireless communications channel 106. In this embodiment of the power-reduction process, the time to communicate the standby and sleep commands from the power control component 104 in the server system 110 is sufficiently less than the average duration of fade of the channel 106.

The described embodiments of the power-reduction process and the portable wireless device 102 of FIG. 1 have the power control component 104 controlling only the wireless interface 108. In other embodiments, the power control component 104 controls additional or different components in the portable wireless device 102 upon detecting a fade condition. One skilled in the art will appreciate that the power control component may be formed from suitable analog or digital circuitry, or both, and also could be formed from suitable software executing on the processor 112.

Similarly, the components 108 and 112–118 may be formed from suitable analog and/or digital circuitry, and, where appropriated, may be formed in software. The portable wireless device 102 may also include more, fewer, or different components depending on the designed functionality of the device. Moreover, the functions performed by each of the components 108, and 112–118 in the portable wireless device 102 may be combined or divided differently among components contained in the device. For example, the wireless interface 108 can include circuitry to process the received standby, sleep, and power-up commands, or the processor 112 could execute software to process these commands. Similarly, the user input and output devices 116 and 118 could be combined into a single device such as a touch screen. One skilled in the art will understand suitable circuitry and/or software for forming the components 104, 108, and 112–118. The wireless communications channel 106 may be any suitable type of wireless channel, such as a wireless local area network (WLAN) channel using suitable ones of the 802.11 family of Institute of Electrical and Electronics Engineers (IEEE) specifications.

In another embodiment of the wireless network 100 of FIG. 1, the portable wireless device 102 also includes a power control component that operates in a manner analogous to the component 104 in the server system 110 to detect a fade condition and place the portable wireless device 102 into the sleep mode of operation. In further embodiment, the power control component 104 is contained in the portable wireless device 102 instead of the server system 110, and operates in an analogous way to detect a fade condition and place the device 102 into the sleep mode. In still another embodiment, the power control component 104 could communicate a value for the average duration of fade to the portable wireless device 102 via the channel 106. When a fade condition is detected, the wireless device 102 would enter the sleep mode responsive to the sleep command just as previously described, but would thereafter determine when the average duration of fade time had lapsed and enter the normal mode automatically after this time without the need for the power control component 104 in the server system 110 to transmit the power-up command.

One skilled in the art will understood that even though various embodiments and advantages of the present invention have been set forth in the foregoing description, the above disclosure is illustrative only, and changes may be made in detail, and yet remain within the broad principles of the invention. Therefore, the present invention is to be limited only by the appended claims.

What is claimed is:

1. A method of controlling the operation of devices which communicate over a wireless communications channel, the method comprising:

determining a parameter of a received signal communicated over the wireless communications channel;

determining a minimum threshold value of the received signal;

determining an average duration of fade using the parameter and the minimum threshold value;

detecting whether the received signal is less than the minimum threshold value;

placing at least one of the devices in a sleep mode for approximately the average duration of fade in response to the received signal being detected as less than the minimum threshold value;

setting a flag value that is equal to the minimum threshold value plus a margin value;

detecting whether the received signal is less than the flag value; and placing at least one of the devices in a standby mode in response to the received signal being detected as less than the flap value.

2. The method of claim 1 wherein determining a parameter of a received signal comprises determining a root mean square value of the received signal.

3. The method of claim 2 wherein the average duration of fade is given by the following formula:

$$\bar{\tau} = \frac{\exp(\rho^2) - 1}{\rho f_m \sqrt{2\pi}}$$

where $f_m$ is the maximum Doppler frequency of the received signal, and $\rho$ is the normalized local rms amplitude of a Rayleigh fading envelope of the received signal.

4. The method of claim 1 further comprising placing the at least one device in a normal mode of operation approximately the average duration of fade after the portable wireless device is paced in the sleep mode.

5. The method of claim 1 wherein the devices that communicate over the wireless communications channel comprise a portable wireless device and a server system, and wherein the received signal comprises a signal transmitted by the portable wireless device and received byte server system.

6. The method of claim 5 wherein placing at least one of the devices in a sleep mode for the average duration of fade comprises:

communicating a sleep mode command from the sewer system to the portable wireless device in response to the received signal being detected as less than the minimum threshold value;

placing the portable wireless device in the sleep mode for approximately the average duration of fade responsive to the sleep mode command; and placing the server system in the sleep mode for approximately the average duration of fade in response to the received signal being detected as less than the minimum threshold value.

7. The method of claim 6 further comprising communicating a wake-up command from the sewer system to the portable wireless device approximately after the average duration of fade.

8. The method of claim 1 wherein the devices that communicate over the wireless communications channel comprise a portable wireless device and a server system, and wherein the received signal comprises a signal transmitted by the server system and received by the portable wireless device.

9. A method of controlling operation of portable wireless device that communicates over a wireless communications channel:

sampling a received signal communicated over the wireless communications channel;

determining a root-mean-square value of the received signal from the samples;

determining a minimum threshold of the received signal;

determining an average duration of fade using the rms value and the minimum threshold;

setting a flag value equal to the minimum threshold plus a margin value;

detecting whether the received signal is less than the flag value;

communicating a standby command over the wireless communications channel;

placing the portable wireless device in a standby mode responsive to the standby command;

detecting whether the received signal is less than the minimum threshold;

communicating a sleep command over the wireless communications channel;

placing the portable wireless device in a sleep mode responsive to the sleep command; and after approximately the average duration of fade, placing the portable wireless device in a normal made of operation.

10. The method of claim 9 wherein the average duration of fade is given by the following formula:

$$\bar{\tau} = \frac{\exp(\rho^2) - 1}{\rho f_m \sqrt{2\pi}}$$

where $f_m$ is the maximum Doppler frequency of the received signal, and $\rho$ is the normalized local rms amplitude of a Rayleigh fading envelope of the received signal.

11. The method of claim 9 wherein the portable wireless device communicates over a wireless communications channel to a second wireless device, and wherein sampling a received signal comprises sampling a signal transmitted over the wireless communications channel and received by the second wireless device.

12. A system for controlling operation of a portable wireless device that communicates over a wireless communications channel comprising:

a power control component adapted to receive a signal communicated over a wireless communications channel, the power control component operable to set a flag value that is equal to a minimum threshold value for a received signal plus a margin value, to detect a fade condition of the received signal by detecting whether the received signal is less than the flag value, and from this detected fade condition to generate an avenge duration of fade value, and the component further operable responsive to detecting the fade condition to transmit a sleep mode command over the wireless communications channel; and a portable wireless device, including a processor, and a wireless interface coupled to the processor and operable in a normal mode to communicate signals over a wireless communications channel, and the wireless interface being adapted to receive the sleep command communicated over the wireless communications channel and operable in a sleep mode for approximately an average duration of a fade condition in response to the sleep command.

13. The portable wireless device of claim 12 wherein the wireless interface is adapted to receive a power-up command communicated over the wireless communication channel and is operable responsive to the power-up command to terminate operation in the sleep mode and commence operation in the normal mode.

14. The portable wireless device of claim 12 further comprising:
  an input device coupled to the processor;
  an output device coupled to the processor; and
  a memory coupled to the processor.

15. A power control component adapted to receive a signal communicated over a wireless communications channel,
  the power control component operable
    to set a flat value that is equal to a minimum threshold value for a received signal plus a margin value,
    to detect a fade condition of the received signal by detecting whether the received signal is less than the flag value,
    and from this detected fade condition to generate an average duration of fade value, and the component further operable responsive to detecting the fade condition to transmit a sleep mode command over the wireless communications channel, the sleep command containing information to cause a device receiving the command to enter a sleep mode of operation for approximately the average duration of fade.

16. The power control component of claim 15 wherein the power control component detects a fade condition of the received signal by determining an rms value and a minimum threshold value of the received signal, and determining an average duration of fade using the rms and minimum threshold values.

17. The power control component of claim 16 wherein the power control component is further operable to transmit a power-up command over the wireless communications channel approximately the duration of fade after transmitting the sleep mode command.

18. A wireless network device adapted to receive a signal over a wireless communications channel, the wireless network device including
  a power control component operable
    to set a flag value that is equal to a minimum threshold value for a received signal plus a margin value,
    to detect a fade condition of the received signal by detecting whether the received signal is less than the flat value, and
    to calculate an average duration of the detected fade condition,
  the wireless network device being further operable responsive to the power control component detecting a fade condition of the received signal by detecting that the received signal is less than the flag value, to transmit a sleep mode command over the wireless communications channel, the sleep mode command including information indicating the average duration of fade such that signals will not be communicated to the device over the communications channel for approximately the average duration of fade.

19. The wireless network device of claim 18 wherein the wireless network device is part of a wireless network having a client-server architecture, and wherein the wireless network device corresponds to a server system in the network architecture.

20. The wireless network device of claim 18 wherein the power control component detects a fade condition of the received signal by determining an rms value and the minimum threshold value of the received signal, and determining an average duration of fade using the rms and minimum threshold values.

21. The wireless network device of claim 20 wherein the power control component transmits the average duration of fade along with the sleep mode command.

22. The wireless network device of claim 18 wherein the wireless network device is further operable to transmit a power-up command over the wireless communications channel approximately the duration of fade alter transmitting the sleep mode command.

23. A computer-readable medium containing instructions for controlling a computer system to control the operation of a device which communicates over a wireless communications channel by performing the operations of:
  determining a parameter of a received signal communicated over the wireless communications channel;
  determining a minimum threshold value of the received signal;
  determining an average duration of fade using the parameter and the minimum threshold value;
  detecting whether the received signal is less than the minimum threshold value;
  placing the device in a sleep mode for approximately the average duration of fade in response to the received signal being detected as less than the minimum threshold value;
  setting a flag value that is equal to the minimum threshold value plus a margin value;
  detecting whether the received signal is less than the flag value; and
  placing at least one of the devices in a standby mode in response to the received signal being detected as less than the flat value.

24. The computer-readable medium of claim 23 wherein determining a parameter of a received signal comprises determining a root mean square value of the received signal.

25. The computer-readable medium of claim 24 wherein the average duration of fade is given by the following formula:

$$\bar{\tau} = \frac{\exp(\rho^2) - 1}{\rho f_m \sqrt{2\pi}}$$

Where $f_m$ is the maximum Doppler frequency of the received signal, and $\rho$ is the normalized local rms amplitude of a Rayleigh fading envelope of the received signal.

* * * * *

UNITED STATES PATENT AND TRADEMARK OFFICE
CERTIFICATE OF CORRECTION

PATENT NO. : 7,190,980 B2  Page 1 of 1
APPLICATION NO. : 10/769044
DATED : March 13, 2007
INVENTOR(S) : Vinay Kumar Deolalikar et al.

It is certified that error appears in the above-identified patent and that said Letters Patent is hereby corrected as shown below:

In column 9, line 5, in Claim 1, delete "flap" and insert -- flag --, therefor.

In column 9, line 24, in Claim 4, delete "paced" and insert -- placed --, therefor.

In column 9, line 29, in Claim 5, delete "byte" and insert -- by the --, therefor.

In column 9, line 34, in Claim 6, delete "sewer" and insert -- server --, therefor.

In column 9, line 46, in Claim 7, delete "sewer" and insert -- server --, therefor.

In column 10, line 15, in Claim 9, delete "made" and insert -- mode --, therefor.

In column 10, line 48, in Claim 12, delete "avenge" and insert -- average --, therefor.

In column 11, line 10, in Claim 15, delete "flat" and insert -- flag --, therefor.

In column 11, line 43, in Claim 18, delete "flat" and insert -- flag --, therefor.

In column 12, line 14, in Claim 22, delete "alter" and insert -- after --, therefor.

In column 12, line 41, in Claim 23, delete "flat" and insert -- flag --, therefor.

Signed and Sealed this

Twenty-fourth Day of November, 2009

David J. Kappos
*Director of the United States Patent and Trademark Office*